(12) United States Patent
Stone et al.

(10) Patent No.: US 6,519,657 B1
(45) Date of Patent: Feb. 11, 2003

(54) METHOD AND DEVICE FOR IDENTIFYING AN ACTIVE 1394A NODE ATTACHED TO A 1394B NETWORK

(75) Inventors: Glen David Stone, Campbell, CA (US); David James, Palo Alto, CA (US); Scott Smyers, San Jose, CA (US); Jose Diaz, San Jose, CA (US)

(73) Assignees: Sony Electronics, Inc., Park Ridge, NJ (US); Sony Corporation, Tokyo (JP)

( * ) Notice: Subject to any disclaimer, the term of this patent is extended or adjusted under 35 U.S.C. 154(b) by 127 days.

(21) Appl. No.: 09/634,804

(22) Filed: Aug. 8, 2000

Related U.S. Application Data

(60) Provisional application No. 60/148,229, filed on Aug. 9, 1999.

(51) Int. Cl.[7] .............................................. G06F 13/38
(52) U.S. Cl. .............................. 710/10; 710/8; 710/15; 710/306; 710/311; 709/222
(58) Field of Search ............................ 710/8, 10, 101, 710/104, 105, 15, 62, 128, 300, 305, 306, 311; 709/222

(56) References Cited

U.S. PATENT DOCUMENTS

| | | | |
|---|---|---|---|
| 5,920,698 A | * | 7/1999 | Ben-Michael et al. ...... 709/224 |
| 6,061,746 A | | 5/2000 | Stanley et al. ................. 710/10 |
| 6,131,119 A | * | 10/2000 | Fukui .......................... 709/224 |
| 6,157,650 A | * | 12/2000 | Okuyama et al. ........... 370/401 |

FOREIGN PATENT DOCUMENTS

JP          10093597 A      4/1998     ........... H04L/12/40

\* cited by examiner

*Primary Examiner*—Thomas Lee
*Assistant Examiner*—Ilwoo Park
(74) *Attorney, Agent, or Firm*—Wagner, Murabito & Hao LLP

(57) ABSTRACT

A method and device for identifying that a 1394a node is actively attached to a 1394b network and indicating so to the 1394b network. In one embodiment, a border node first determines that a 1394a node is actively attached to the border node. Then, the border node sets a reserved bit in a self-identification packet, indicating the active presence of the 1394a node. Then, during the self-identification process, the border node transmits the self-identification packet into a 1394b network, indicating to all 1394b nodes in the 1394b network that there is a border node with an active connection to a 1394a node. Next, the 1394b nodes in the 1394b network of compliant devices alter their behavior for arbitration purposes, such that an 1394a network and a 1394b network may share a communication link.

19 Claims, 14 Drawing Sheets

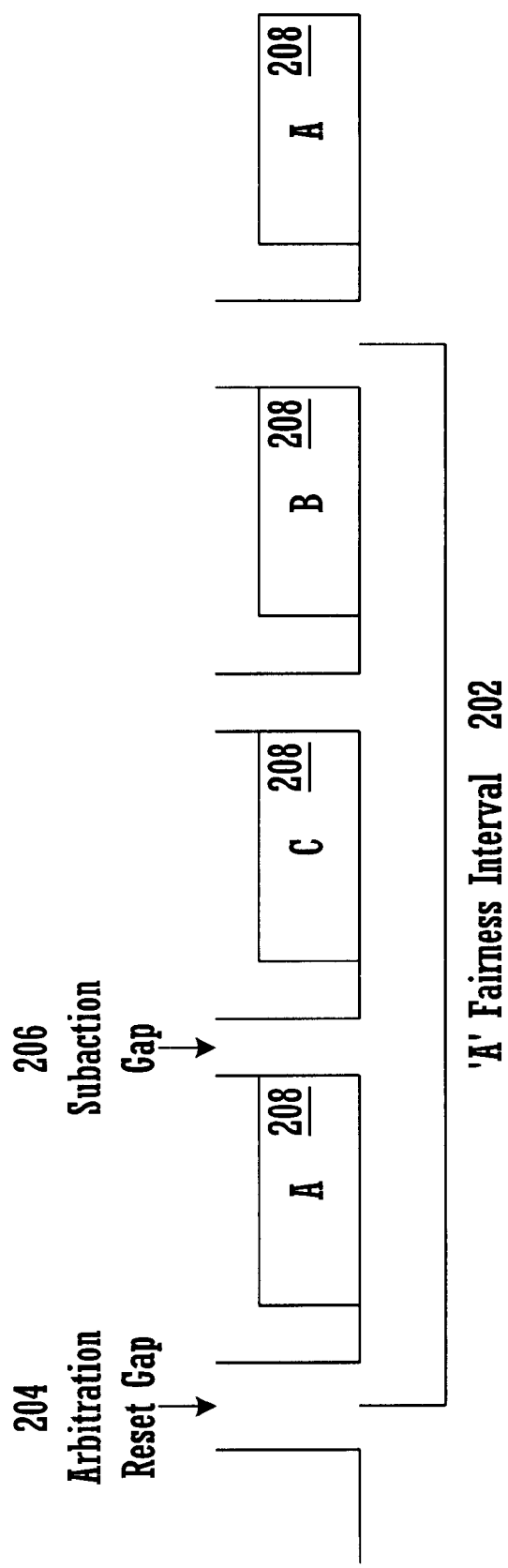

METHOD AND DEVICE FOR IDENTIFYING AN ACTIVE 1394A NODE ATTACHED TO A 1394B NETWORK

RELATED U.S. APPLICATION

This Application claims priority to U.S. Provisional Application entitled, "A Method of Partitioning a. Hybrid Network of Devices Into Arbitration Domains," Application No. 60/148,229, filed on Aug. 9, 1999, which application is hereby incorporated by reference.

FIELD OF THE INVENTION

The present invention relates to the field of networked devices. Specifically, the present invention relates to a device and method for identifying an active IEEE 1394–1995/P1394a node attached to an IEEE 1394b network and indicate its presence to the 1394b network.

BACKGROUND ART

One conventional technique for media to share a high performance serial bus can be found in the IEEE Std 1394-1995 specification and the amendment to that specification 1394a-2000 (herewithin both may be referred to as the 1394a standard). Devices which conform to that standard may be known as 1394a compliant devices. A second technique for media to share a high speed serial bus is contemplated in the as yet uncompleted IEEE P1394b (herewithin 1394b standard). Devices which conform to the latter specification may be known as 1394b compliant devices. A need exists for a method which allows both 1394a compliant devices and 1394b compliant devices to share the same bus despite the different standards to which they conform.

Creating such a method and device is problematic because the two standards define different bus arbitration mechanisms. FIG. 1A illustrates an exemplary sequence of bus transfers according to the 1394a standard. The sequence includes an A fairness interval 202, during which each device has an opportunity to transfer exactly one packet 208. After a device transfers a packet 208, it must wait for a new A fairness interval 202 to begin, which is indicated by an arbitration reset gap 204. Thus, once device A has transferred its first packet 208 it must wait for the arbitration reset gap 204 to transfer a second packet 208. A device which has not yet transferred a packet 208 in a given A fairness interval 202 only needs to wait for a subaction gap 206, which is shorter than an arbitration reset gap 204.

A further characteristic of the 1394a standard is that a device may not request bus access until the arbitration reset gap 204 or subaction gap 206 has completed, depending upon whether the device has transferred a packet 208 in the A fairness interval 202 or not. After the request, there may be a time lag before that device is granted bus access. Another characteristic of the 1394a standard is that the same device (node) always serves as the root node once selected after a bus reset.

FIG. 1B illustrates an exemplary sequence of bus transfers according to the 1394b standard. Included in the sequence is a B fairness interval 212 during which each device has an opportunity to transfer exactly one packet 208. After a device transfers a packet 208, it must wait for a new B fairness interval 212 to begin. However, the 1394b standard does not call for arbitration reset gaps (FIG. 1A, 204). Furthermore, the 1394b standard allows a device to issue a request for bus access while another device is still transferring a packet 208. Consequently, the delay between devices transferring packets 208 may be less than occurs under the 1394a standard. The 1394a standard also calls for bus grants 210, although they are not shown in FIG. 1A. An additional difference between the two standards is that in the 1394b standard, the last device to transfer a packet 208 serves as the arbitrator. Other differences exits between the two standards as well.

If a network is to comprise nodes that comply with different standards, then it is desirable to inform nodes of at least one type that the network comprises nodes of different types. One conventional notification method uses special signals to communicate this information to nodes. However, generating special signals is cumbersome and inefficient.

SUMMARY OF THE INVENTION

Thus, a need has arisen for a method and device that allow 1394b compliant devices to be aware that 1394a compliant devices are connected to the same communication link. A further need exists for such a method and device which is efficient and is compliant with IEEE standards.

Embodiments of the present invention provide a method and device for efficiently notifying a 1394b network of nodes that a 1394a node is actively attached to a border node that is, in turn, attached to the 1394b network. Embodiments provide for such a method and device that is both efficient and is compliant with the framework of the IEEE 1394 standards.

A method and device for identifying that a 1394a node is actively attached to a 1394b network and indicating so to the 1394b network is disclosed. In one embodiment, a border node first determines that a 1394a node is actively attached to the border node. Then, the border node sets a reserved bit in a self-identification packet, indicating the active presence of the 1394a node. Then, during the self-identification process, the border node transmits the self-identification packet into a 1394b network, indicating to all 1394b nodes in the 1394b network that there is a border node with an active connection to a 1394a node. Next, the 1394b nodes in the 1394b network of compliant devices alter their behavior for arbitration purposes, such that an 1394a network and a 1394b network may share a communication link.

BRIEF DESCRIPTION OF THE DRAWINGS

FIG. 1A is a diagram of an 'A' fairness interval, according to conventional art.

DETAILED DESCRIPTION OF THE INVENTION

Figure 1B:
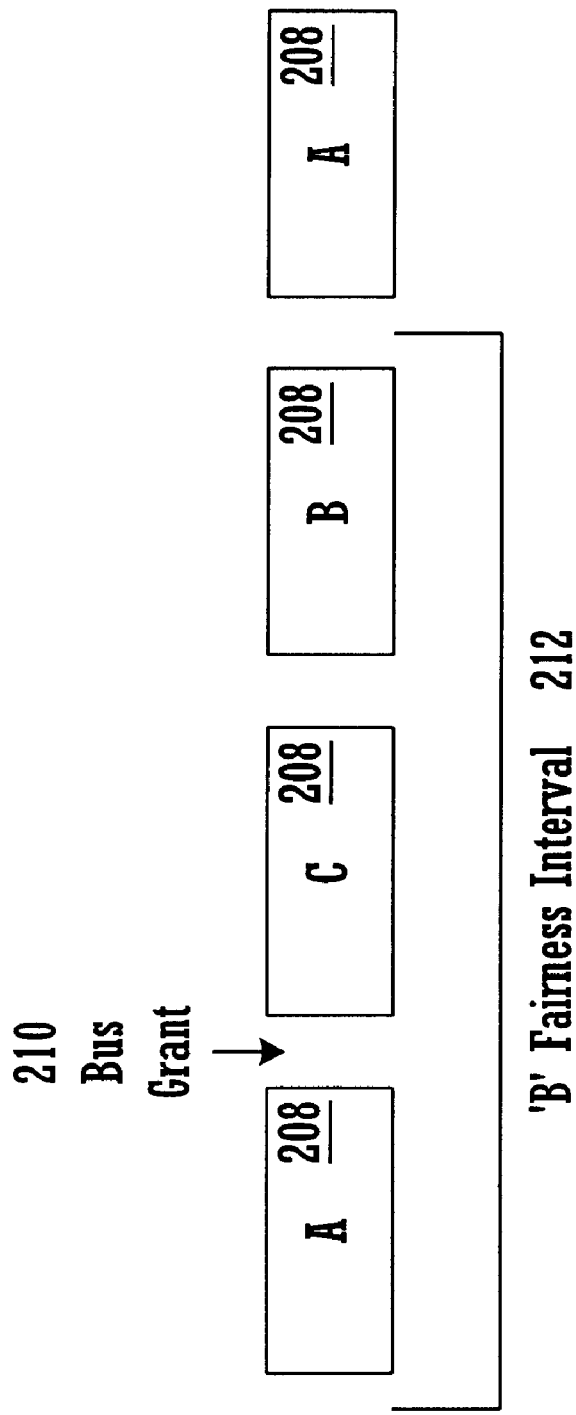
FIG. 1B is a diagram of an a 'B' fairness interval, according to conventional art.

In the following detailed description of the present invention, a method and device for identifying an active 1394-1995/P1394a node (herewithin 1394a node) attached to a 1394b network and indicate its presence to the 1394b network, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Topology

Embodiments of the present invention provide for a method of identifying that at least one 1394a node is actively attached to a 1394b network through a border node. (For example, the 1394a node may be either a 1394-1995 node or a 1394a-2000 node). Embodiments also provide for notifying the 1394b nodes of the presence of the 1394a node. Consequently the 1394b node may alter their behavior to accommodate the 1394a node(s).

Figure 2:
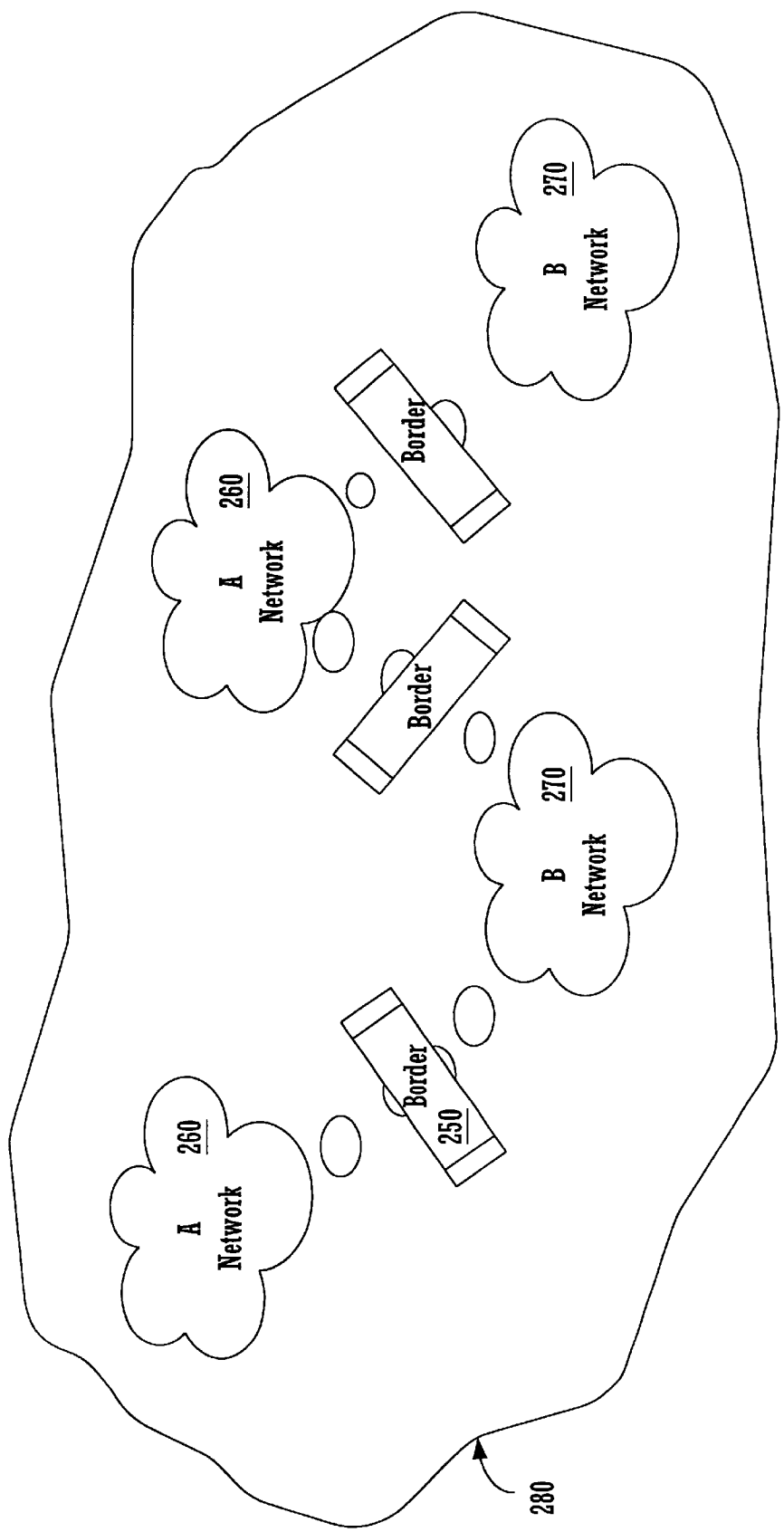
FIG. 2 is a diagram illustrating an example topology of an extended network of individual networks of 1394a compliant devices and 1394b compliant devices, in which an embodiment of the present invention may be practiced.

For purposes of illustration, FIG. 2 illustrates an exemplary hybrid network 280. Note that FIG. 2 is an example for illustration purposes, but it should be obvious to one skilled in the art that any arbitrary network composed of compliant 1394a devices and compliant 1394b devices can operate using the methods described in this specification, provided that such network topology complies with the normative topology assumptions, rules and limitations clearly defined in the 1394a and 1394b standards.

The term "network" is used herein to refer to a collection of devices, or nodes, all interconnected using either the 1394a or 1394b high performance serial bus. An "A network" is a network composed of only 1394a compliant nodes whereas a "B network" is a network composed of only 1394b compliant devices.

FIG. 2 illustrates two A networks 260 and two B networks 270. Interconnecting each network is a node with special capabilities labeled in FIG. 2 as a "Border" node 250. The description below describes the capabilities of the border node 250 and its effect on the operation of the B network 270 as it relates to this invention. Also described in the description below is the overall operation of the illustrated extended network 280.

Definition and Operation of the Border Node

The border node 250 is an operational 1394 node implementing two or more ports where at least one port is compliant with the 1394a standard and may be connected to an operational 1394a compliant node and at least one of the remaining port or ports is compliant with the 1394b standard and is connected to an operational 1394b compliant node.

The purpose of the border node 250 is to enable the inter-operability and co-existence of both 1394a compliant arbitration mechanisms and 1394b compliant arbitration mechanisms within a single network. These arbitration mechanisms are formally defined in their respective standards and they are not reiterated herein except as necessary to describe embodiments of the present invention.

When there is a border node 250 in a hybrid network 280, it has no effect on the operation of any 1394a nodes 804 anywhere in the hybrid network 280; however, a border node's presence in a hybrid network 280 does effect the operation of 1394b nodes, as described below.

During the self-ID process at bus reset, the border node 250 transmits a self-identification (self-ID) packet to the directly adjacent 1394b node or nodes. This self-ID packet contains information indicating that it is from a border node 250 having a least one active connection to a 1394a node.

The border node 250 simultaneously transmits the same self-ID packet to the adjacent 1394a node or nodes. Except for this additional piece of information, the self-ID packet from the border node 250 and the conditions under which it is transmitted comply with all 1394a and 1394b requirements.

Upon receiving one or more border node 250 self-ID packets, all 1394b nodes in the B network 270 change their rules of operation to comply with hybrid fabric rules, which this application defines. All 1394b nodes continue to operate in this mode until a bus reset occurs in which no border node 250 self-ID packets are detected.

In addition to issuing a self-ID packet, the only responsibilities of the border node 250 are to translate between the 1394b signaling and physical media and the 1394a signaling and physical media. During the tree-ID process, the border node 250 has additional responsibilities, as described below. Also defined below are the responsibilities and operation of the border nodes 250 during arbitration.

Minimally, a border node 250 is a physical (PHY) layer circuit only. If a border node 250 has an active link, then the border node 250 must be boss capable and participate in all 1394b compliant arbitration rules. In all cases, the border node 250 is capable of all 1394a required functionality, including arbitration gap timer and root capable.

Operation of Extended Network

In an extended (hybrid) network 280 composed of A networks 260 and B networks 270, there is one and only one 1394a root. This root can be any 1394a node in the extended network 280, including a border node 250 with an active connection to a 1394a node. Additionally, each B network 270 in a hybrid network 280 has exactly one local root, as it does in B networks 270 that are not a part of a hybrid network 280.

In a hybrid network 280, 1394a nodes 804 do not know that they are operating in a hybrid network 280, and their behavior is the same as in an A network 260 that is not in a hybrid network 280. However, 1394b devices discover that they are in a hybrid network 280. Additionally, they are required to behave differently during the tree-ID process and during arbitration when operating in a hybrid network 280, as described herein.

Exemplary Tree-ID Process

Figure 3:
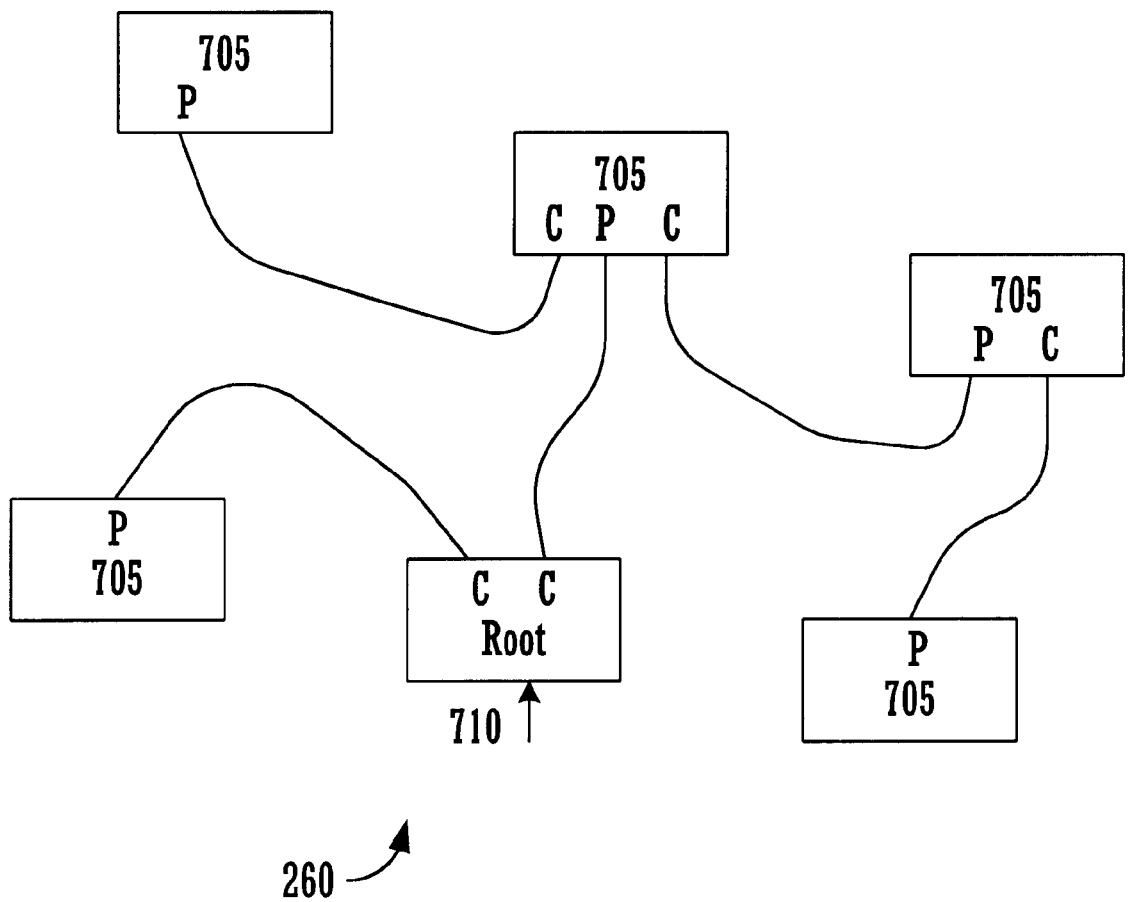
FIG. 3 is a diagram illustrating a completely resolved 1394a bus, according to an embodiment of the present invention.
Figure 4A:
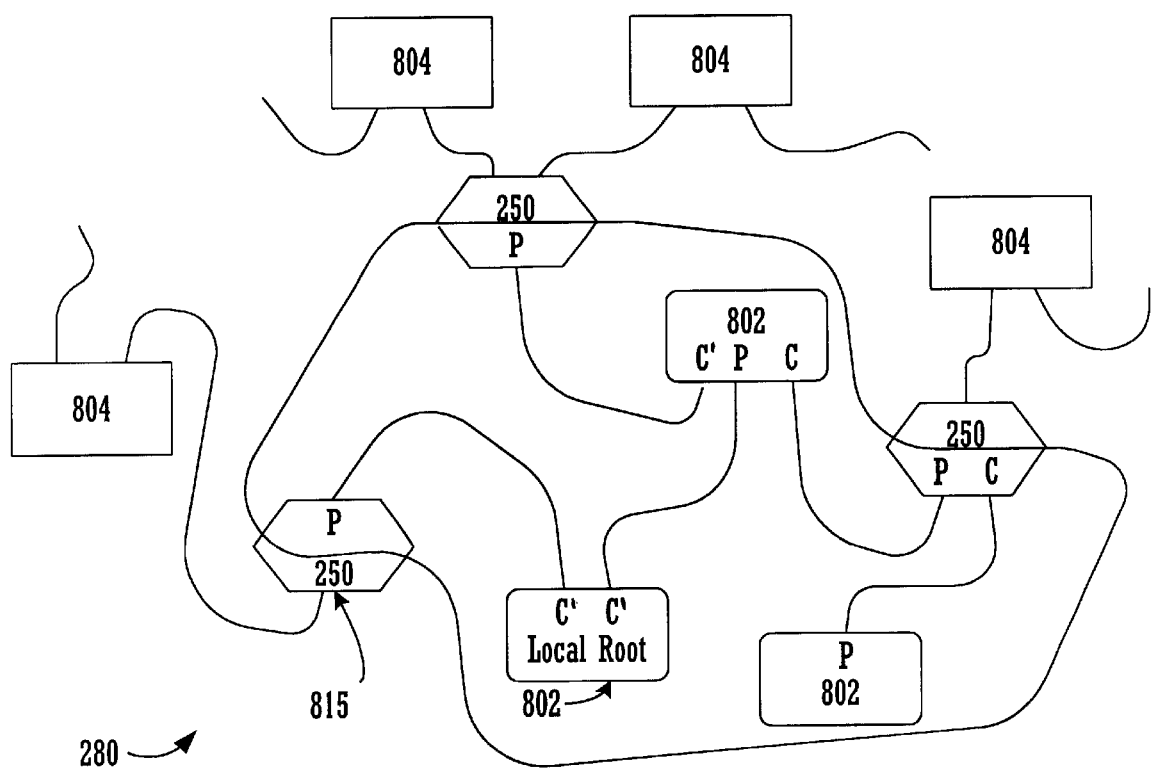
FIG. 4A is a network diagram illustrating a completely resolved B network in a hybrid network, according to an embodiment of the present invention.
Figure 4B:
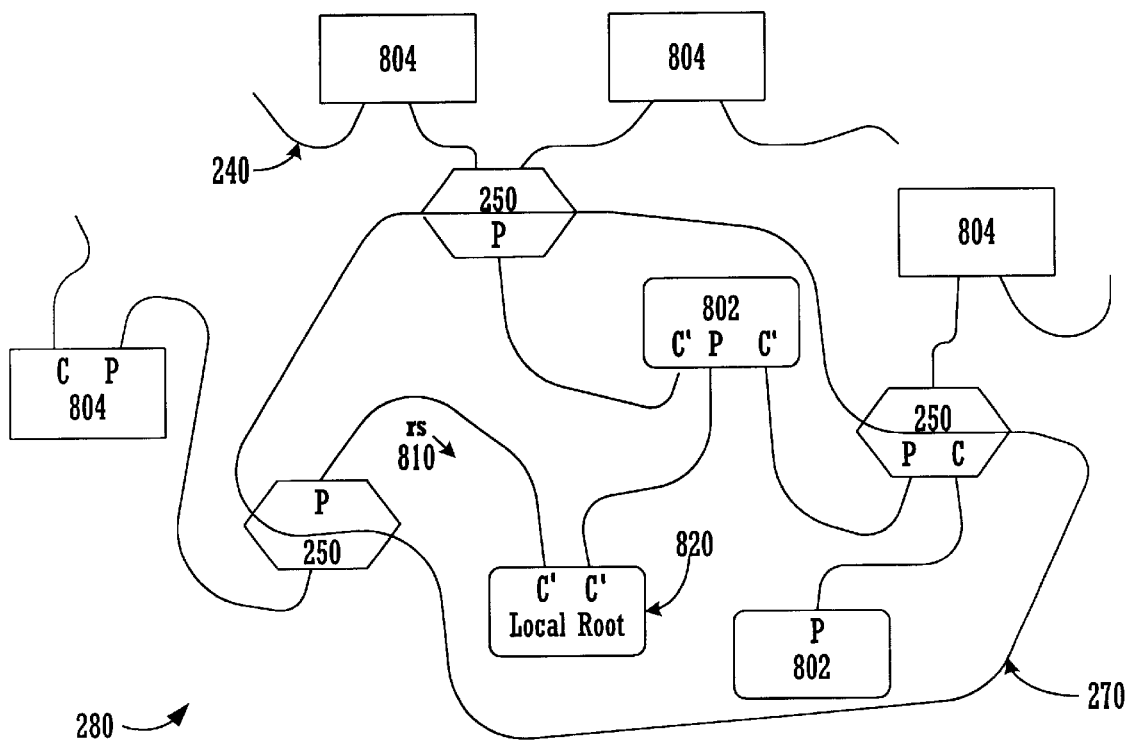
FIG. 4B is a network diagram illustrating a border node which is sending a resolved signal into a B network, according to an embodiment of the present invention.
Figure 4C:
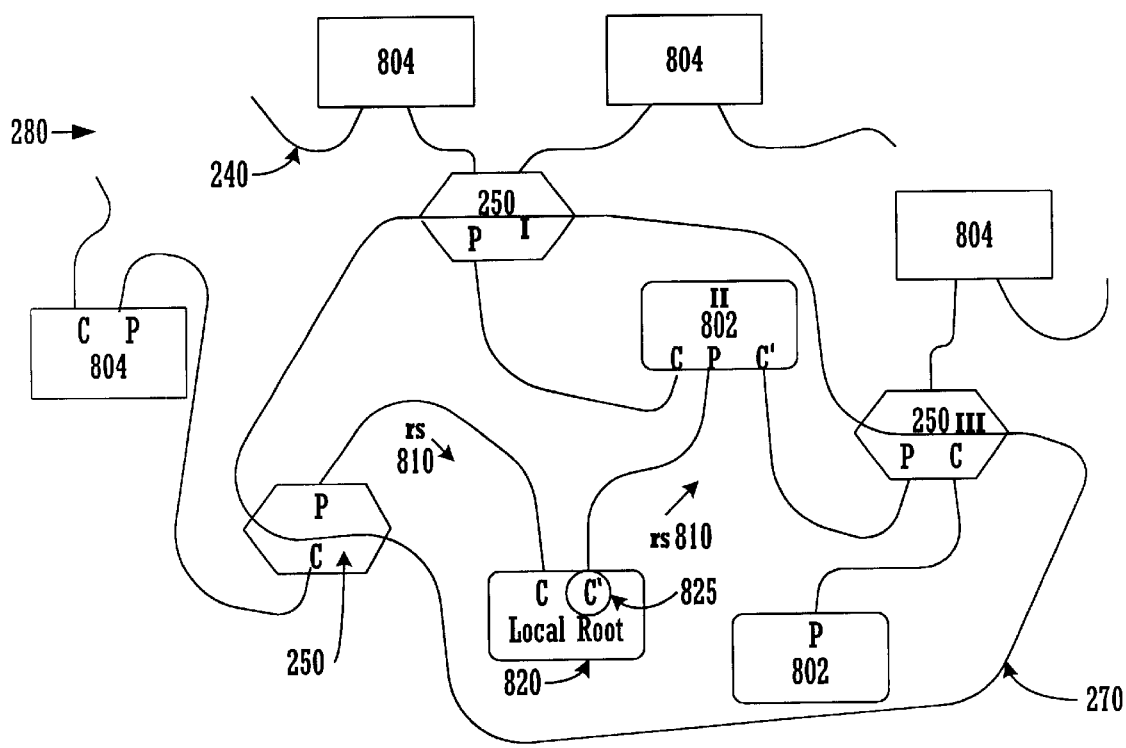
FIG. 4C is a network diagram illustrating a local root in a B network forwarding a resolved signal, according to an embodiment of the present invention.
Figure 4D:
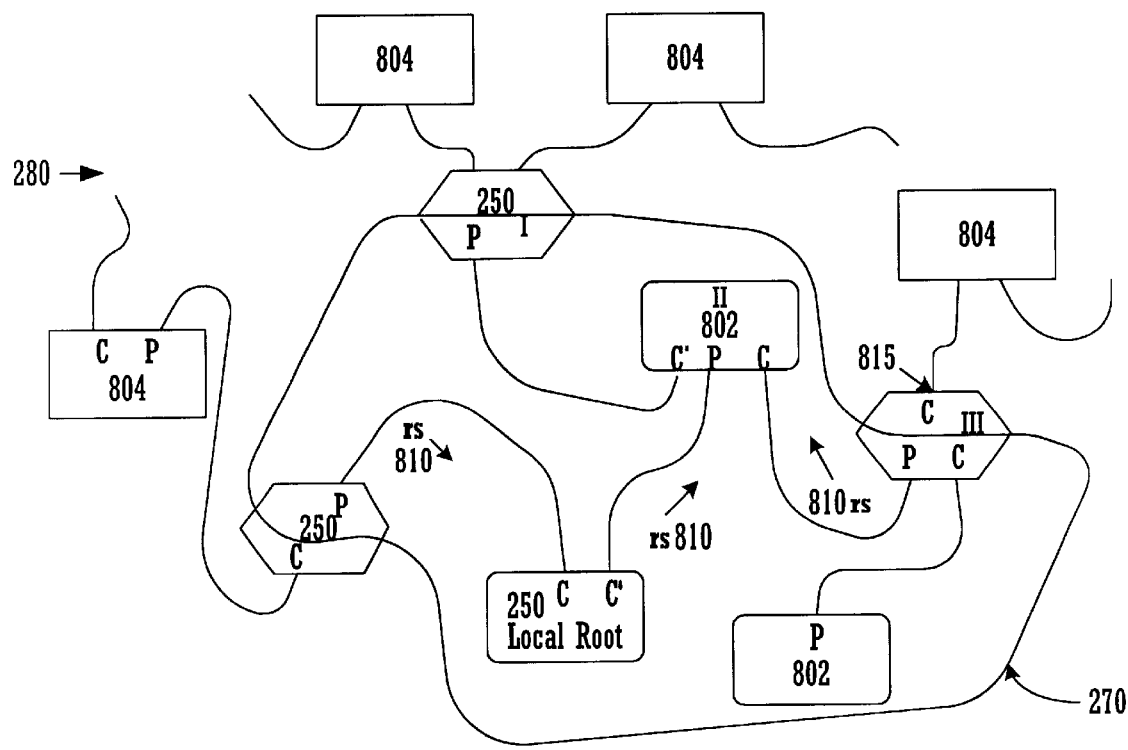
FIG. 4D is a network diagram illustrating a border node which is sending a resolved signal into a B network, according to an embodiment of the present invention.
Figure 4E:
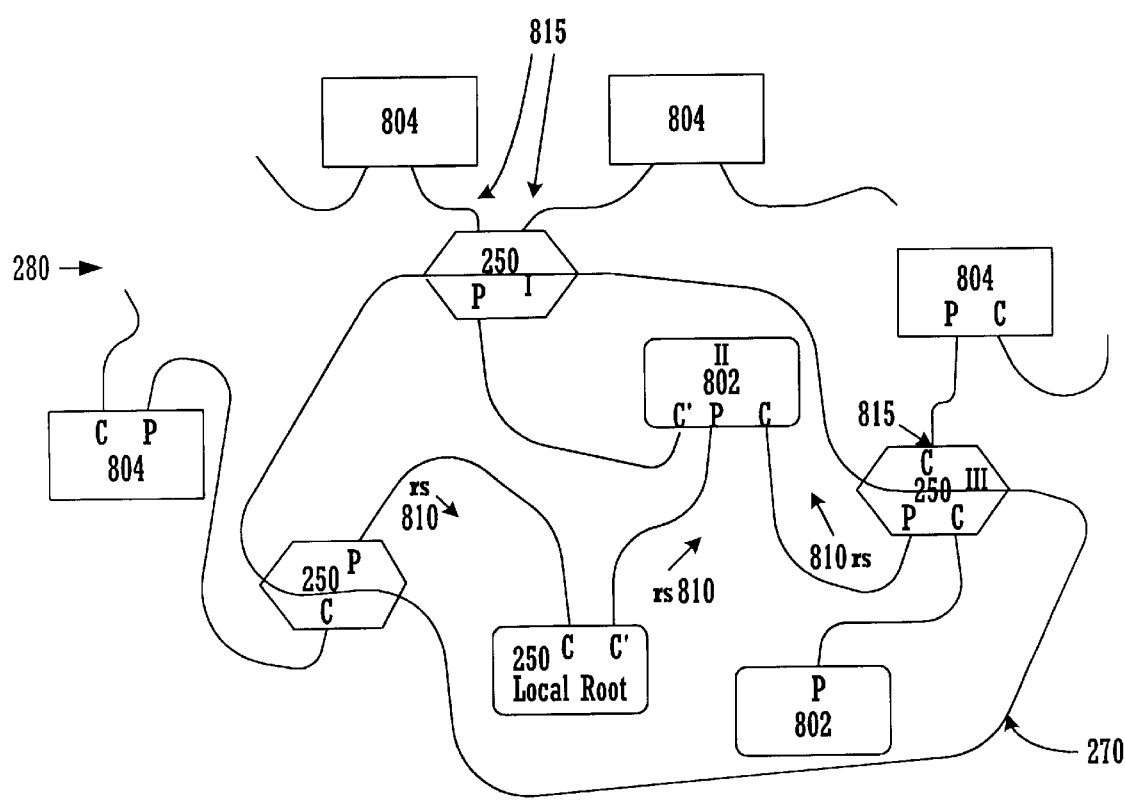
FIG. 4E is a network diagram illustrating a 1394b node forwarding a resolved signal, according to an embodiment of the present invention.
Figure 4F:
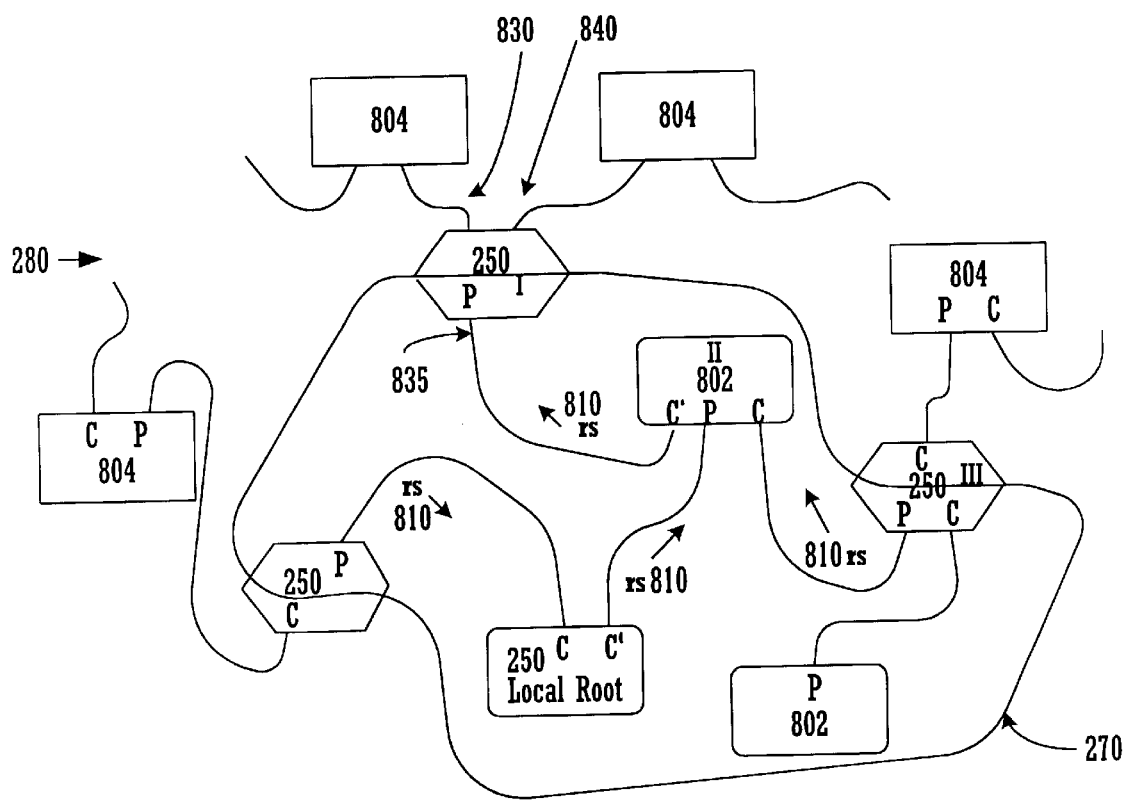
FIG. 4F is a network diagram illustrating a completely resolved extended hybrid network, according to an embodiment of the present invention.

An embodiment of the present invention can be described by a more specific example, which is illustrated in FIGS. 3–4F. Referring to FIG. 3, during the tree-ID process of a bus reset in an A only network 260, each leaf 705 may initiate the parent/child resolution protocol thereby establishing a hierarchical relationship with the only adjacent node (leaves have exactly one adjacent node by definition). As the process proceeds, each node which has exactly one connected but unresolved (parent or child) port may initiate the parent/child resolution protocol on that one unresolved port. After all ports are resolved, exactly one node will have only children ports (e.g., only ports connected to children). This node is the root 710 of the 1394a bus. FIG. 3 shows a completely resolved 1394a bus.

In a hybrid network 280, at bus reset each B network 270 goes through the tree-ID process separate from all other B networks 270, thereby identifying a local root for each and every B network 270. During this tree-ID process wholly within the B network 270, all border nodes 250 that sense an active connection to a 1394a node signal this fact to the parent port before completing the port resolution process on the parent port. If a border node 250 has no parent ports, then it is the local root, by definition, and its operation is described below.

During the hybrid tree-ID process, border nodes 250 do not count unresolved 1394a ports when considering when they may initiate the port resolution protocol on unresolved ports. In other words, border nodes 250 may initiate the 1394b parent/child port resolution protocol when they have exactly one unresolved 1394b connection, regardless of how many unresolved 1394a connections may remain. Additionally, border nodes 250 may accept the "you are my parent" signal from any 1394a connection at any time.

The result is that the local root of each B network 270 knows which child ports are ultimately connected to border nodes 250. Similarly, every 1394b node in the tree knows which of its child ports, if any, is connected ultimately to a border node 250.

FIG. 4A illustrates a completely resolved B network 270 in a hybrid network 280 containing three border nodes 250, three 1394b compliant devices 802, and four 1394a compliant devices 804. All the nodes are connected via a shared communication link 240. The communication link 240 may be an IEEE 1394 serial bus. For example, an IEEE 1394a serial bus, an IEEE 1394b serial bus, or the like may be used. However, the present invention is not limited to these communication links. Child ports which are connected toward a border node 250 are labeled C'.

Still referring to FIG. 4A, the border nodes 250 are waiting for their 1394a connections 815 to be resolved one by one. If, at this point, the local root has more than one C' port, the local root also waits.

Referring now to FIG. 4B, when all the 1394a connections 815 of a border node 250 are resolved, that border node 250 signals this condition through its parent port toward the local root 820, using a resolved signal 810. Note that the only way that all 1394a ports 815 of a border node 250 are resolved is if they are all child ports, due to the nature of the 1394a tree-ID process. FIG. 4B shows one border node 250 with all of its 1394a connections resolved and sending the resolved signal 810 toward the local root 820.

Any node which receives the resolved signal 810 on one of its C' ports changes that port to a normal child port (designated as C). Intervening non-border nodes on the path toward the local root which have any C' ports (i.e., C' ports on which the resolved signal has not yet been received) shall not forward the resolved signal 810 toward the local root 820 until they are receiving the resolved signal 810 on all C' ports (thereby eliminating all C' ports and converting them to C ports). Intervening border nodes 250 shall not forward the resolved signal 810 received on any of it's C' ports unless all 1394a connections are resolved and there are no C' ports remaining.

Referring now to FIG. 4C, when the local root 820 has exactly one C' port 825, it forwards the resolved signal 810 down that C' port 825. At this point, node 11 is receiving the resolved signal 810 on its parent port and it has two remaining C' ports 825. As an observation, nodes which are not the local root 820 that receive the resolved signal 810 on their one parent port, then follow the same rules as does the local root 820. The text below describes this in more detail. As with the local root 820, node 11 has more than one C' port 825 and it is receiving the resolved signal 810 on its parent port. In this state, node 11 does nothing.

In FIG. 4C, all 1.394a ports 815 on border node III are resolved, border node III then sent the resolved signal 810 to node II resulting in node II now having only one C' port 825. As when the local root had one C' port 825, node II forwards the resolved signal 810 to border node I.

Referring now to FIG. 4E, border node I is receiving the resolved signal 810 on its parent port, but both of its 1394a connections 815 are unresolved. In this condition and this condition only, border node I shall behave as a 1394a only node for purposes of tree-ID. Specifically, when it has one unresolved 1394a connection 815, it performs the port resolution protocol on that one connection 815. FIG. 4F illustrates this.

Shown in FIG. 4F are several actions. Specifically, border node I received a "you are my parent" signal on its left hand 1394a connection 830, and resolved that connection as a child port. Since border node I was receiving the resolved signal 810 on its parent port 835, it then immediately initiated the port resolution protocol on its one remaining unresolved 1394a port 840 resulting in that port becoming a parent port. In this example, the directly adjacent 1394a node became the one 1394a root for purposes of all arbitration among 1394a nodes 804 in the extended network 280.

This example does not treat the case where a border node 250 is simultaneously sending and receiving the resolved signal 810, as could happen depending on the timing of the overall tree-ID process. If a border node 250 finds that it is simultaneously sending and receiving the resolved signal 810, then it performs the backoff/retry protocol with the adjacent node from which the resolved signal 810 is coming. In this way, the border node 250 will end up either sending the resolved signal 810 or receiving it, but not both.

Another condition which is not explicitly treated by this example is when a border node 250 is receiving the resolved signal 810, and all of its 1394a connections are already resolved as child ports. If this happens, then that border node 250 acts as the 1394a root for the extended network 280. If, on the other hand, a border node 250 with only 1394a child ports is sending the resolved signal 810, then some other border node 250 in that same B network 270 is the 1394a root for the extended network.

Now the tree-ID process of the extended hybrid network 280 is complete. Since the local root 820 in all B networks 270 participated in the hybrid tree-ID process, they retain the knowledge that they are operating in a hybrid network 280. This knowledge slightly alters how they proceed with the self-ID process and with arbitration.

Extended Hybrid Network Self-ID Process

In a hybrid network 280, the entire self-ID process is performed using 1394a rules, meaning that the one 1394a root orchestrates all activities.

The only difference in behavior in 1394b nodes 802 is that the border node(s) in each B network 270, at the time that they send a self-ID packet, include information in that packet which identifies to all other 1394b nodes 802 in the B network 270 that there is a border node 250 in the B network 270 with active 1394a connections. This difference describes hybrid self-ID rules. All 1394b nodes 802 then remember that they are in a hybrid network 280 and slightly modify their behavior for purposes of arbitration.

Figure 5:
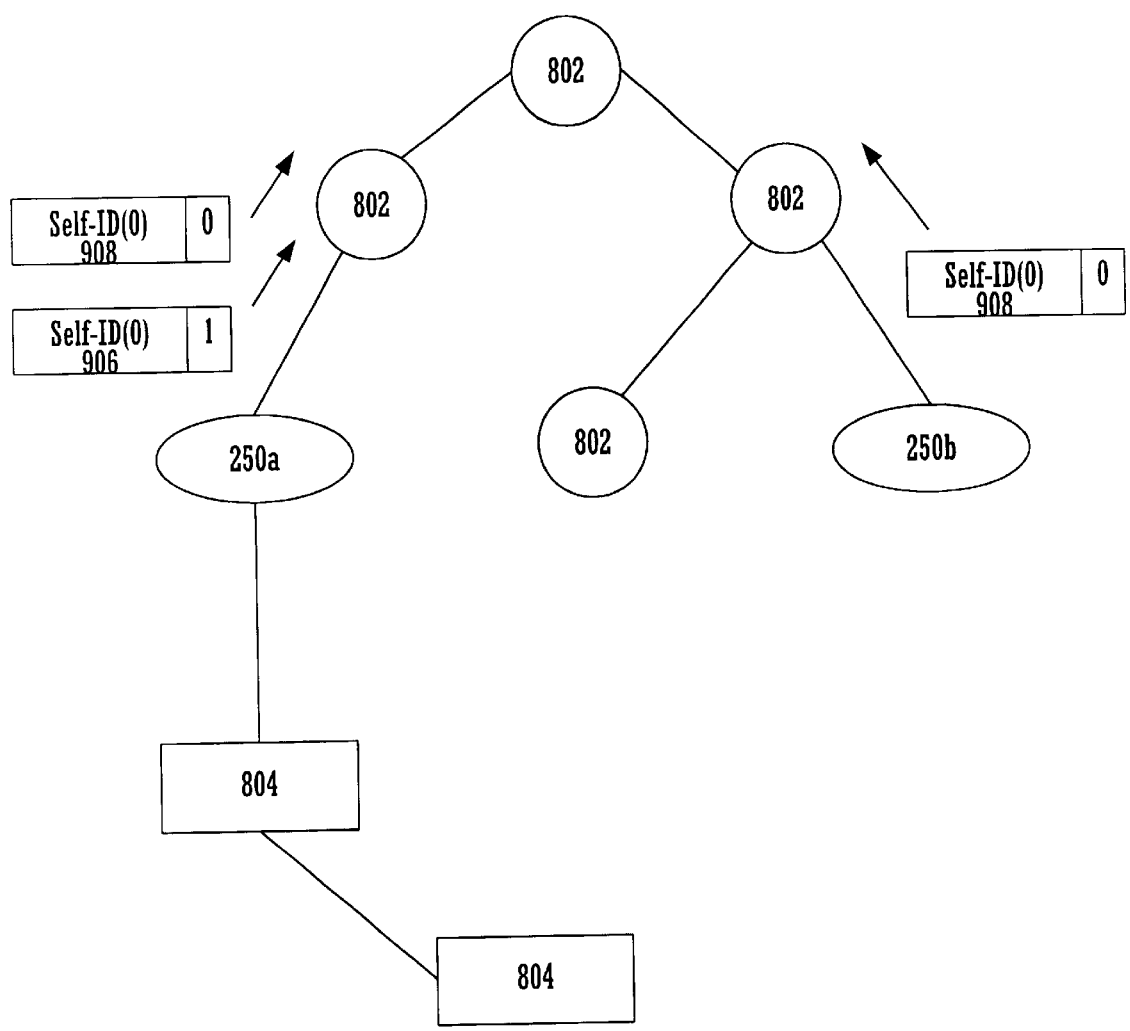
FIG. 5 is a diagram illustrating a network of nodes, indicating the conditions when an embodiment of the present invention will generate a self-identification packet indicating the presence of a 1394a node.

Referring now to FIG. 5 a network of nodes is illustrated. The border node 250a to the left detects the presence of an active 1394a node 804 and therefore sends a self-identification (self-ID) packet to the adjacent 1394b node. In this embodiment, the border node 250a first sends self-ID packet zero 908 with no additional information as to the presence of the 1394a nodes 804. Next, it sends self-ID packet one 906, with a reserved bit set to one to indicate that a 1394a node 804 is present.

Still referring to FIG. 5, border node 250b to the right does not have an active 1394a node 804; therefore, it sends a normal self-identification packet zero 908 with no additional bit set. In this case, the border node 250b to the right is not connected to enough nodes to require the sending of self-ID packet one 906. (The number of self-ID packets sent depends on the number of nodes connected to the sending node.) If the border node 250b to the right were connected to enough other non-1394a nodes 804 to require the sending of self-ID packet one 906, the reserved bit will not be set, thus indicating that no 1394a node 804 is connected to this border node 250b. (For example, the border node 250b may be connected to other border nodes 250 or to 1394b nodes 802.)

Figure 6:
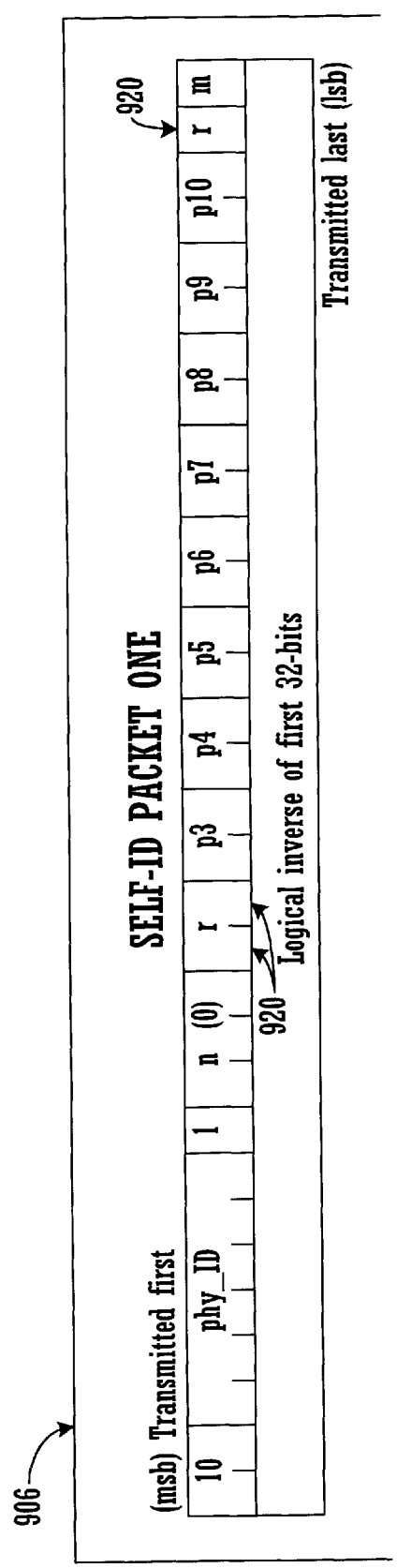
FIG. 6 is an illustration of a self-identification packet, which an embodiment of the present invention issues to notify a 1394b node that a 1394a node is actively attached.

FIG. 6 illustrates an exemplary self-ID packet 906. The self-identification packet shown is a 1394a self-ID packet one. The format for 1394-1995 self-ID packets one, two, and three is identical in format. In this embodiment, self-ID packet one 906 is used, which has three available reserved bits 920. This may be either a 1394–1995 or 1394a self-ID packet one 906. However, the present invention is not limited to using self-ID packet one 906. In other embodiments, other self-ID packets may be used. Furthermore, the present invention is well-suited to using any of the reserved bits 920 in self-ID packet one 906 to indicate that a 1394a node 804 is actively connected to the border node 250.

Figure 7:
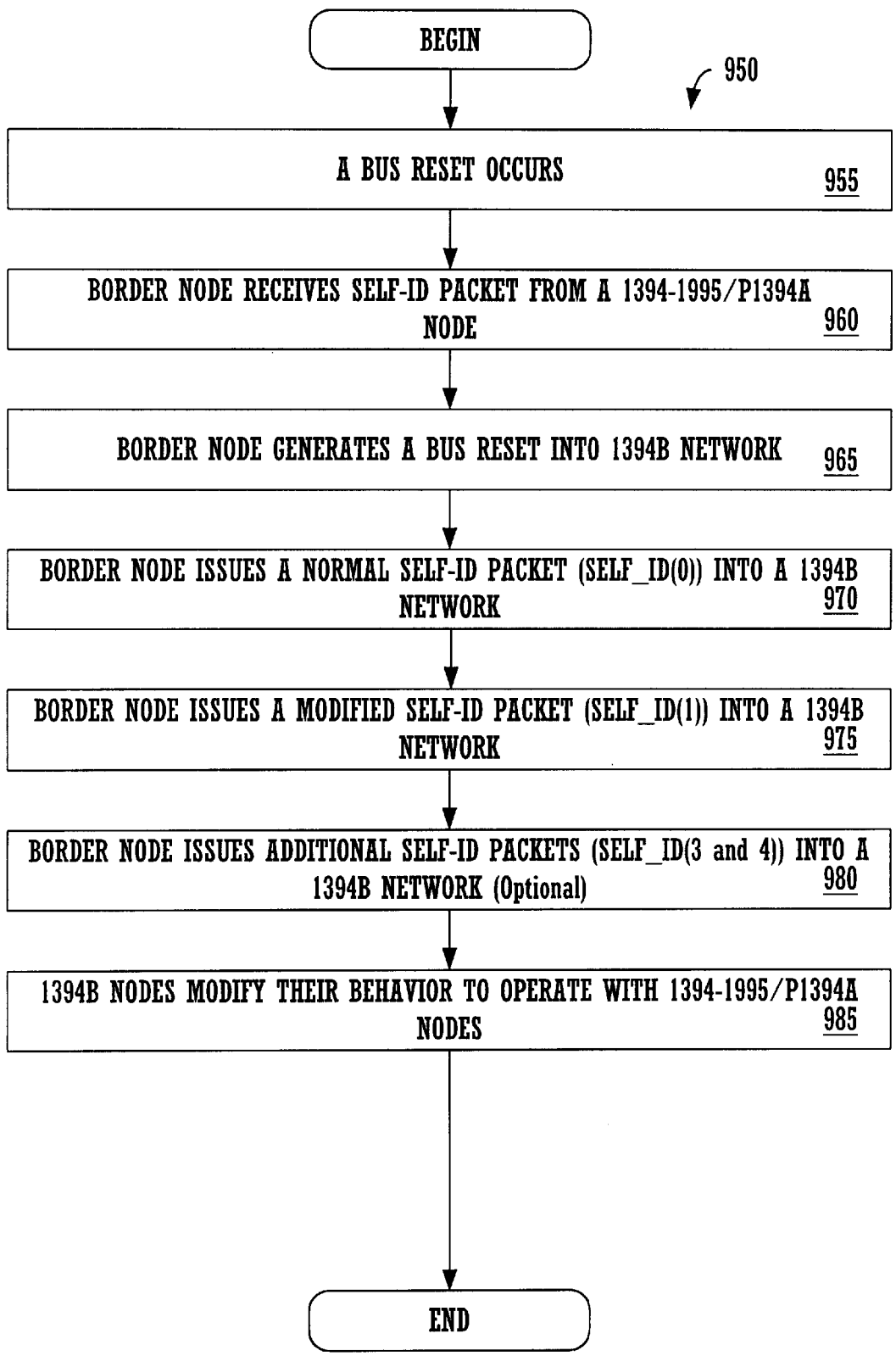
FIG. 7 is a flowchart illustrating a process of steps of identifying an active 1394a node attached to a 1394b network and notifying the 1394b network of its presence, according to an embodiment of the present invention.

FIG. 7 illustrates the steps of a process 950 of identifying an active 1394a node 804 and indicating its presence to a network of 1394b nodes 802. In step 955, a bus reset occurs. For example, a 1394a node 804 may have just been turned on by a user, triggering the bus reset. Following the bus reset, 1394a nodes 804 will send out self-identification packets. In step 960, a border node 250 receives such a self-ID packet. This may come from either a 1394-1995 node or a 1394a-2000 node. In this application, both types of nodes may be known as 1394a nodes.

In step 965, the border node 250 generates a bus reset into the 1394b network 270. In step 970, the border node 250 issues a normal self-ID zero packet into the 1394b network 270.

Next, in step 975, the border node 250 issues a self-ID packet with added information to convey the presence of the active 1394a node 804 to the 1394b network 270. For example, the border node 250 may set the second least most significant bit in self-ID packet one 906. In other embodiments, other reserved bits 920 could be used. The present invention is well suited to using either a 1394-1995 self-ID packet or a 1394a self-ID packet.

Step 980 is an optional step of the border node 250 issuing more self-ID packets. This may occur of there are a relatively large number of nodes actively connected to the border node 250, regardless of whether they are 1394a nodes 804 or not. These self-ID packets do not need to have a bit set to indicate the presence of the 1394a node 804, as this only need be done in one packet, regardless of the number of 1394a nodes 804 connected to the border node 250.

In step 985, the 1394b nodes 802 receive the self-ID packet and modify their behavior to operate with the 1394-1995 and/or 1394a nodes 804. The self-ID packets will contain information regarding the speed capabilities of the attached nodes. Therefore, the 1394b nodes 802 will known which speed to use when transferring information.

Arbitration

Immediately after tree-ID and self-ID process, the extended network 280 will go idle and the local root of each 1394b network 270 will be the boss of its respective network.

If a 1394a node 804 wishes to arbitrate, it issues its request signal as per the 1394a standard. If the 1394a root is on the other side of a 1394b network 270, the border node 250 of that 1394b network 270 will have only child ports and will ultimately receive the request. The border node 250 then broadcasts that request into the 1394b network 270. Somewhere in the 1394b network 270 will be either a border node 250 with exactly one 1394a parent port, or a border node 250 which has assumed 1394a root responsibilities, as described in the tree-ID description above.

Ultimately, the one 1394a root will see the request and issue a grant. Among all 1394a devices in the extended network 280, this grant is forwarded according to 1394a rules. A border node 250 which is issuing a request into 1394a network 260 of 1394a nodes 804 and which subsequently receives a grant broadcasts that grant into the 1394b network 270. All 1394b nodes 802 in the 1394b network 270 receiving a grant shall forward it to one and only one 1394b connection which is receiving a broadcast 1394a request. Although all 1394b nodes 802 forward the request to all other 1394b nodes 802, they only forward the grant to one 1394b connection on which a request is being received. Note that under some circumstances, a 1394b node 802 may be simultaneously sending and receiving a request on one of its connections. This is normal.

Eventually, a border node 250 which is sending a request into the 1394b network 270 will receive a grant. This border node 250 then forwards the grant into the 1394a network 260 according to 1394a rules.

A 1394b node 802 arbitrates by sending a request toward the local root, as defined in 1394b. However, the local root, upon receiving this request repeats it back to the entire 1394b network 270 as a 1394a request. The border nodes 250 in that network, then, act as described above for 1394a arbitration, by forwarding the request to the 1394a root. Upon receiving the 1394a grant, the border node 250 repeat the grant back into the 1394b network 270. The 1394b nodes 802 in the network follow the same rules as for forwarding 1394a requests. However, in this example, the local root is originating the request, so it will ultimately see the grant. When it does, it ceases sending the request and immediately grants a 1394b style grant.

At this point, the 1394b network 270 is permitted to go through an entire 1394b fairness interval, but no more.

At the end of a 1394b fairness interval, boss returns to the local root, and the local root then puts the bus into idle for at least one arbitration reset gap time. This implies that all 1394b devices must have a gap counter and must correctly respond to PHY configuration packets which set that timer.

In this way, during a 1394a fairness interval, all 1394a devices 804 are given an opportunity to arbitrate using the subaction gap, and they are given an opportunity to observe the arbitration reset gap. In addition, each 1394b network 270 is permitted to go through one fairness interval as part of the 1394a fairness interval.

If a 1394b boss recognizes cycle synch during a 1394b fairness interval, it shall return boss to the local root at the next asynchronous packet boundary. The local root will also observe the cycle synch and it therefore shall remain idle for a least one subaction gap time.

Phy Configuration Packets

All border nodes 250 in the extended network 280 forward all 1394a PHY configuration packets to the entire B network 270 to which they are directly attached. Border nodes 250 receiving such packets on one of their 1394b ports forward the packet into the attached A network 260 as a 1394a compliant PHY configuration packet.

Cycle Master

The cycle master of the extended (hybrid) network 280 is the 1394a root. If a node in the B network 270 wishes to have this function for the extended network 280, it must use the root holdoff bit mechanism to assure that any one of the border nodes 250 in that network become the 1394a root. In this case, the B node wishing to be cycle master can control the border node 250 which is 1394a root in order to transfer the timing function from the border node 250 to the intended cycle master 1349b node.

Figure 8:
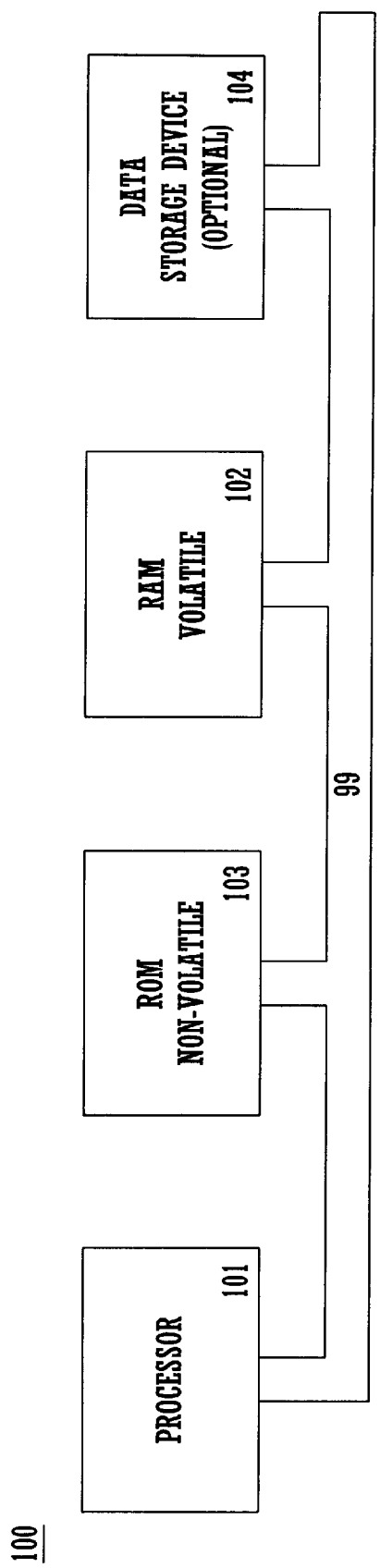
FIG. 8 is a schematic of a computer system, which may be used as a platform to implement embodiments of the present invention.

FIG. 8 illustrates circuitry of computer system 100, which may form a platform for a portion of the any of the nodes, including a border node 250.

Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

The preferred embodiment of the present invention a method and device for identifying an active 1394-1995/P1394a node 804 attached to a 1394b network and indicating its presence to the 1394b network, is thus described. While the present invention has been described in particular embodiments, it should be appreciated that the present invention should not be construed as limited by such embodiments, but rather construed according to the below claims.

What is claimed is:

1. A method of identifying a 1394a node actively connected to a network of 1394b nodes, said method comprising the steps of:
    a) determining that a 1394a node is actively connected to a border node; and
    b) said border node issuing a self-identification packet to a 1394b node, wherein said self-identification packet contains information to indicate said 1394a node is actively attached to said border node.

2. The method of claim 1 further comprising the step of:
    c) said border node setting a bit in said self-identification packet in response to a bus reset.

3. The method of claim 2 wherein said bit is a reserved bit.

4. The method of claim 2 wherein said self-identification packet is the second self-identification packet said border node issues after said bus reset.

5. The method of claim 1 wherein said step a) comprises the step of:
    a1) said border node receiving a self-identification packet from said 1394a node.

6. The method of claim 1 further comprising the step of:
    c) said border node generating a bus reset in said 1394b network.

7. The method of claim 1 wherein said 1394a node is a 1394–1995 node.

8. The method of claim 1 wherein said 1394a node is a 1394a-2000 node.

9. The method of claim 1 wherein said step b) further comprises the step of:
- b1) said border node issuing said self-identification packet during a self-identification process.

10. A border node comprising a processor coupled to a bus and memory coupled to said bus wherein said memory contains processor instructions for implementing a method of identifying an active 1394a node attached to a network of 1394b nodes, said method comprising the steps of:
- a) determining that a 1394a node is actively connected to said border node; and
- b) said border node issuing a self-identification packet to a 1394b node in said network of 1394b nodes, wherein said self-identification packet contains information to indicate said 1394a node is actively attached to said border node.

11. The border node of claim 10 wherein said step a) of said method comprises the step of:
- a1) said border node receiving a self-identification packet from said 1394a node.

12. The border node of claim 10 wherein said method further comprises the step of:
- c) said border node setting a bit in said self-identification packet.

13. The border node of claim 12 wherein said bit is a reserved bit.

14. The border node of claim 10 wherein said method further comprises the step of:
- c) said border node generating a bus reset in said 1394b network.

15. A method of identifying a 1394a node actively connected to a network of 1394b nodes, said method comprising the steps of:
- a) determining that a 1394a node is actively connected to a border node attached to said network of 1394b nodes;
- b) said border node issuing a self-identification packet to a 1394b node in said network of 1394b nodes, wherein said self-identification packet contains information to indicate said 1394a node is actively attached to said border node;
- c) said 1394b node receiving said self-identification packet; and
- d) said 1394b node altering its behavior, wherein said 1394b node may communicate with said 1394a node.

16. The method of claim 15 wherein said step a) comprises the step of:
- a1) said border node receiving a self-identification packet from said 1394a node.

17. The method of claim 15 further comprising the step of:
- c) said border node setting a bit in said self-identification packet.

18. The method of claim 17 wherein said bit is a reserved bit.

19. The method of claim 15 further comprising the step of:
- c) said border node generating a bus reset in said 1394b network.

* * * * *